United States Patent Office 3,561,286
Patented Feb. 9, 1971

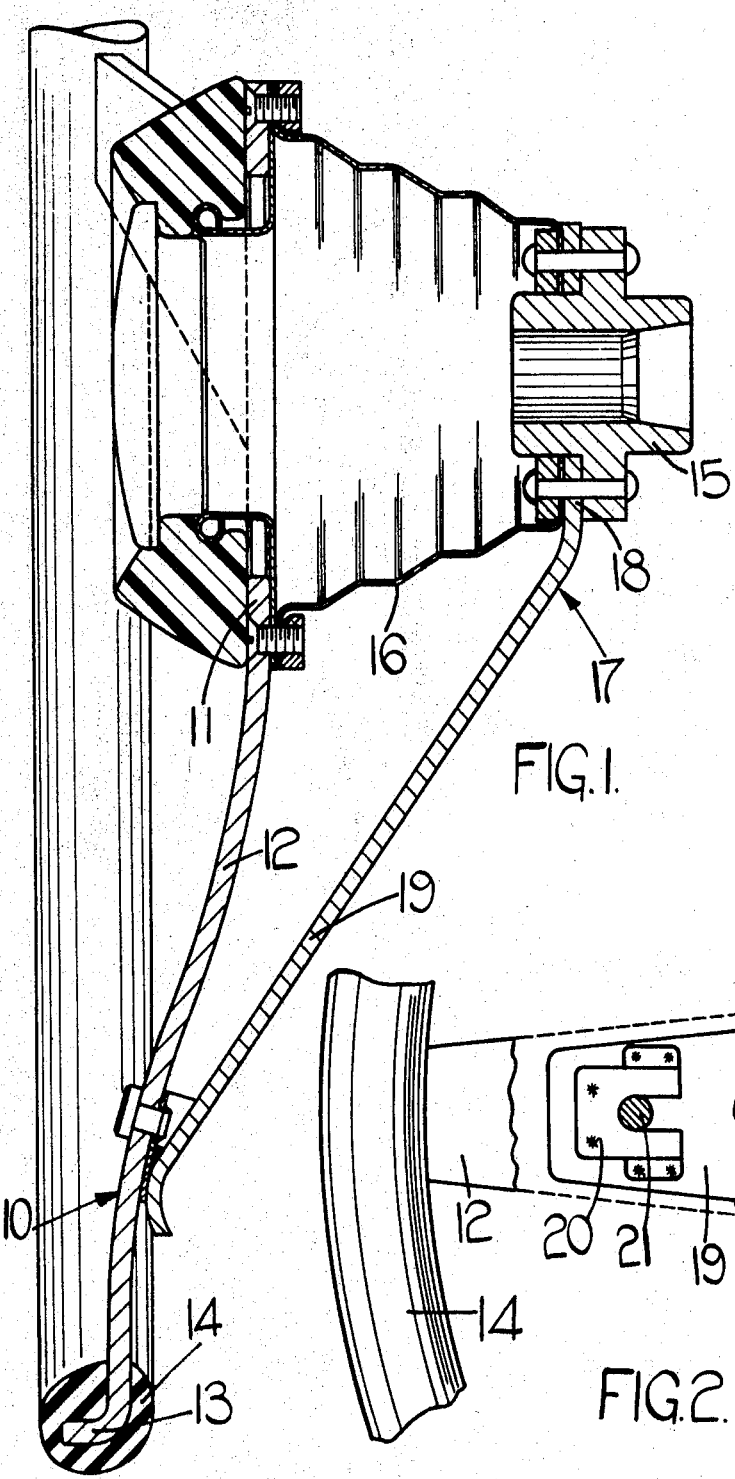

3,561,286
STEERING WHEELS
Stanley John Edge, Sutton Coldfield, and Trevor John Williams, Henley in Arden, Solihull, England, assignors to Clifford Covering Company Limited, Birmingham, England
Filed Jan. 7, 1969, Ser. No. 789,524
Claims priority, application Great Britain, Jan. 17, 1968, 2,487/68
Int. Cl. B62d 1/04
U.S. Cl. 74—552  5 Claims

ABSTRACT OF THE DISCLOSURE

A steering wheel comprises a frame having a centre portion, spokes and a rim. The centre portion is mounted on a collapsible impact-absorbing press carried by a hub. The hub is also connected by arms to the spokes by means of connections which can detach on impact.

---

This invention relates to steering wheels and has as an object to provide a steering wheel in a convenient form.

A steering wheel in accordance with the invention comprises a frame, a hub for mounting on a steering wheel, a collapsible device coupling the frame to the hub and adapted to permit angular and axial displacement of the frame relative to the hub, such displacement being accompanied by the absorption of impact energy by said collapsible device, and a plurality of flexible arms projecting from said hub and connected at their ends to the frame in such a manner as to brace the frame relative to the hub for normal use, but arranged to be disconnected therefrom in the event of an impact against the frame to permit the latter to be displaced relative to the hub as aforesaid.

An example of the invention is shown in the accompanying drawings in which:

FIG. 1 is a section through the steering wheel, and
FIG. 2 is a fragmentary cut-away elevation of the wheel.

The wheel comprises a frame including a one-piece pressing 10 defining an annular centre portion 11, radially projecting spokes 12 and a rim 13 of L-shaped cross-section. The rim 13 has a moulded covering 14 of rubber or foamed synthetic resin material.

The centre portion 11 of the frame is connected to a hub 15 by means of a collapsible, energy absorbing device in the form of a deep drawn metal pressing 16. This pressing 16 is of generally frusto-conical form, but its wall is of convoluted form so that, under an axial compressive load, the pressing will collapse whilst substantially continuously absorbing energy. At its larger end the pressing 16 has an external flange by means of which it is secured to the centre portion 11. At its smaller end the pressing 16 has an inturned flange by means of which it is connected to the hub 15.

Fixed to the hub 15 is a second pressing 17 constituted by a centre ring 18 and a plurality of flexible arms 19 respectively underlying the spokes 12 of the frame. At their outer ends the arms 19 are provided with brackets 20. Each bracket 20 has an open ended slot opening towards the centre of the wheel. These brackets engage pins 21 on the spokes 12.

In normal use the frame is held rigidly on the steering shaft to which the hub 15 is attached, by the bracing action of the arms 19. In the event of a heavy impact on the frame 10, however, there will be a tendency for the frame to tilt about a horizontal axis, bearing in mind that the rim extends in an inclined plane in use, and that any impact is likely to be substantially horizontal. This tilting action will cause the arms 19 to become disconnected from the spokes 12, either by simple disengagement of the brackets 20 from the pins 21 or by shearing of the pins 21. The frame 10 is then substantially free to align itself with the impact, thereby spreading the impact loads over a greater area of the body striking the frame. During such tilting action the pressing 16 is deformed mainly at its smaller end.

The force of the impact will cause the pressing 16 to collapse axially thereby harmlessly absorbing at least a proportion of the energy of the body. Energy will also be absorbed by the arms 19 as they bend back during collapse of the pressing 16.

Although the drawings show a wheel of lightweight construction suitable, for example, for sports car use, it will be appreciated that the invention can likewise be applied to wheels of more conventional construction with covered spokes. In such wheels the spokes could be recessed or grooved to receive and conceal the arms 19.

Having thus described our invention what we claim as new and desire to secure by Letters Patent is:

1. A steering wheel comprising a frame, a hub for mounting on a steering wheel, a collapsible device coupling the frame to the hub and adapted to permit angular and axial displacement of the frame relative to the hub, such displacement being accompanied by the absorption of impact energy by said collapsible device, and a plurality of flexible arms projecting from said hub and connected at their ends to the frame in such a manner as to brace the frame relative to the hub for normal use, but arranged to be disconnected therefrom in the event of an impact against the frame to permit the latter to be displaced relative to the hub as aforesaid.

2. A steering wheel as claimed in claim 1 in which the frame comprises a rim, a centre portion and a plurality of spokes extending between said rim and the centre portion, said centre portion being connected to said collapsible device, and said spokes being connected to said flexible arms.

3. A steering wheel as claimed in claim 1 in which said collapsible device is a metal pressing of generally frusto-conical form, the wall of the pressing being convoluted.

4. A steering wheel as claimed in claim 1 in which the flexible arms are connected to the spokes of the frame by means of brackets on the arms, each bracket having an open-ended slot which receives a pin on the associated spoke.

5. A steering wheel as claimed in claim 1 in which the arms are integral with centre ring mounted on the hub.

References Cited
UNITED STATES PATENTS

| | | | |
|---|---|---|---|
| 2,810,301 | 10/1957 | Mathues | 74—552 |
| 2,894,413 | 7/1959 | Schmid | 74—552 |
| 3,055,231 | 9/1962 | Daniel | 74—492X |
| 3,396,599 | 8/1968 | Altmann | 74—492 |
| 3,434,367 | 3/1969 | Renneker et al. | 74—492 |
| 3,456,526 | 7/1969 | Brilmyer | 74—552 |

FRED C. MATTERN, Jr., Primary Examiner
F. D. SHOEMAKER, Assistant Examiner